United States Patent
Hursey et al.

(10) Patent No.: US 7,983,652 B1
(45) Date of Patent: Jul. 19, 2011

(54) EMERGENCY CALL NOTIFICATION FOR NETWORK SERVICES

(75) Inventors: John Hursey, Lawrenceville, GA (US); Steven Carlson, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 763 days.

(21) Appl. No.: 11/972,409

(22) Filed: Jan. 10, 2008

(51) Int. Cl.
 H04M 11/04 (2006.01)
 H04M 3/42 (2006.01)
 H04M 3/00 (2006.01)
 H04W 4/00 (2009.01)
 H04B 7/00 (2006.01)

(52) U.S. Cl. .............. 455/404.1; 455/415; 455/418; 455/432.3; 455/521

(58) Field of Classification Search .... 455/404.1–404.2, 455/418, 445, 521, 550.1, 556.2, 560–561, 455/403, 410, 415, 432.3, 433, 435.1, 456.1, 455/456.3; 379/45, 37; 725/33
See application file for complete search history.

(56) References Cited

U.S. PATENT DOCUMENTS

| | | | | |
|---|---|---|---|---|
| 6,516,188 B1 * | 2/2003 | New et al. | | 455/404.1 |
| 7,221,928 B2 * | 5/2007 | Laird et al. | | 455/404.1 |
| 7,324,801 B2 * | 1/2008 | Droste et al. | | 455/404.1 |
| 7,522,717 B2 * | 4/2009 | Croak et al. | | 379/102.04 |
| 7,565,130 B2 * | 7/2009 | Chin et al. | | 455/404.1 |
| 7,565,131 B2 * | 7/2009 | Rollender | | 455/404.1 |
| 7,627,307 B2 * | 12/2009 | Droste et al. | | 455/404.1 |
| 7,702,081 B1 * | 4/2010 | Klesper et al. | | 455/404.1 |
| 7,734,019 B1 * | 6/2010 | Terpstra | | 379/37 |
| 2003/0063714 A1 * | 4/2003 | Stumer et al. | | 379/37 |
| 2004/0176066 A1 * | 9/2004 | Binzel et al. | | 455/404.1 |

* cited by examiner

*Primary Examiner* — Meless N Zewdu
(74) *Attorney, Agent, or Firm* — Parks IP Law LLC; Mickki D. Murray, Esq.

(57) ABSTRACT

Enhanced services, such as call restriction, call forwarding, anonymous call rejection, and proprietary services, may interfere with an emergency callback potentially preventing the callback from reaching the intended destination. Systems and methods for processing emergency calls to eliminate emergency callback failure in response to an emergency call being disconnected are provided herein.

59 Claims, 11 Drawing Sheets

EMERGENCY CALL NOTIFICATION FOR NETWORK SERVICES

TECHNICAL FIELD

The present invention relates generally to wireless emergency services and, more particularly, to systems and methods for performing wireless emergency callbacks.

BACKGROUND

When a wireline 911 call is initiated, the call is directed to an assigned local Public Safety Answering Point (PSAP). The PSAP answers the call and receives an inbound telephone number or Automatic Number Identification (ANI) information. This number is used to query an Automatic Location Identification (ALI) database, match it with the corresponding address as a location of the caller, and forward the location information and inbound telephone number to the assigned PSAP. The PSAP can then deliver both the number and the location to the appropriate emergency service (e.g., fire, police and/or ambulance) for dispatch.

The above scenario works well when the 911 call originates from a residence because every residential number is associated with a unique, static residential address. For mobile devices, such as mobile phones, however, the location changes as the mobile device user travels to different locations. Accordingly, the FCC has advanced a technology known as enhanced 911 (E911) to enable mobile devices to process 911 emergency calls and enable emergency services to determine the location of a caller.

Prior to 1996, wireless 911 callers would have to access their service providers to get verification of subscription service before the call could be routed to a PSAP. In 1996, the FCC ruled that a 911 call must be routed directly to the PSAP without receiving verification of service from a specific mobile carrier. The FCC further ruled that the call must be handled by any available carrier even if the carrier is not the caller's home carrier. Under the FCC's rules, all mobile phones manufactured for sale in the United States after Feb. 13, 2000, must be able to operate in analog mode and must include this special method for processing 911 calls.

The FCC has proposed a phased rollout of E911. In 1998, Phase I was implemented and required that mobile carriers identify the originating phone number and the location of the base station or cell within a 1 mile accuracy. Phase I E911 rules require a 7, 8 or 10 digit number to accompany each 911 call. The number provides a callback number for the PSAP dispatcher to use if, for example, the call is disconnected.

In 2001, Phase II was implemented and required that each mobile carrier in the United States offer handset- or network-based location detection capability so that the caller's location is determined by the geographic location of the mobile phone within 100 meter accuracy. The FCC refers to this as Automatic Location Identification (ALI). Phase II E911 rules provide a more accurate location for the dispatcher to use.

The inventors postulate that the emergence of intelligent network services, such as call screening and call forwarding that enable wireless customers to screen incoming calls and forward incoming call to an alternate number, could create obstacles for 911 callbacks. For example, when a 911 call is disconnected, the PSAP will attempt a callback and the incoming call to the customer's mobile device will not include a tag or any special identifier to identify the call as originating from a 911 PSAP. The incoming call appears as normal incoming call to the mobile device. In some instances a calling party number is unavailable, resulting in an unknown number notification being displayed on the mobile device. With this lack of vital information, the call screening service cannot identify the incoming call as an emergency (911) callback. Moreover, if the customer has established call restrictions for their account, the emergency callback may be restricted entirely resulting in the customer receiving no identification as to an incoming call.

Call forwarding services could present another problem. When the PSAP performs a callback and the callback number is subject to a call forwarding request, the incoming callback is automatically forwarded to the forward destination number. A customer may select that only certain, perhaps important, numbers be forwarded while all others be terminated at the primary phone number. In addition, some customers may elect to forward all calls using a call forward unconditional (CFU) service.

SUMMARY

The present invention provides several methods for processing an emergency call so as to eliminate potential callback failure.

One aspect of the present invention is a method for processing an emergency call. The method includes receiving an emergency call at a mobile switching center (MSC). The emergency call originates from a mobile device associated with a wireless telephone customer. The emergency call is then routed a public safety answering point (PSAP). The MSC generates a request message that includes identification information for the customer, such as the customer's mobile subscriber ISDN number (MSISDN). Alternatively, the identification information can include the International Mobile Subscriber Identity (IMSI). The MSC routes the request message to an emergency callback platform. The emergency callback platform is configured to process the request message to determine if the customer is subscribed to at least one enhanced service that, when activated, interferes with an emergency callback initiated in response to the emergency call being disconnected from the PSAP. If the emergency callback platform determines that the customer is subscribed to the at least one enhanced service, then the callback platform generates a notification message. The notification message can be directed to an enhanced service database configured to validate the customer and disable the enhanced service for a pre-determined time period so as to allow completion of the emergency callback. Accordingly, the emergency callback platform routes the notification message to the enhanced service database. The database validates the customer based upon the identification information and disables the enhanced service for a pre-determined time period. As an alternative to the above method, the emergency callback platform validates the customer and disables the enhanced service for the pre-determined time period.

The aforementioned method can further include receiving the emergency callback, at the MSC, in response to the emergency call being disconnected. In response to the emergency callback, the emergency callback platform or the enhanced service database can be queried to determine a status of the enhanced service. The status can identify whether the enhanced service is enabled or disabled. The MSC can then connect the emergency callback to the mobile device in accordance with normal call delivery procedures.

In one embodiment, the request message and/or the notification message is an unstructured supplementary service data (USSD) message.

In another embodiment, the request message and/or the notification message is a short message service (SMS) message.

In yet another embodiment, the request message and/or the notification message is a CAMEL message.

In another embodiment, the request message and/or the notification message is an out-of-band message.

In still another embodiment, the request message is routed to the emergency callback platform in parallel with the emergency call being routed to the PSAP.

In one embodiment, the enhanced service is one of a call restriction service, a call forwarding service, a bar all incoming calls (BAIC) service, an anonymous call rejection service, or a proprietary service provided by one of a mobile carrier and a vendor.

In an alternative method, the request message can be generated by an emergency transit switch that is configured to receive and route all emergency calls to the appropriate PSAP. The functions performed by the emergency callback platform and enhanced service database remain the same.

In another alternative method, the MSC can initiate a session with a gateway mobile location center (GMLC) and the GMLC can generate an event record for the emergency call that is sent to the emergency callback platform in lieu of the request message for similar processing.

In yet another alternative method, the request message is generated by the mobile device.

A computer-readable medium that includes computer-executable instructions for performing the above methods are also described herein.

Systems for implementing the above methods are also described herein.

DETAILED DESCRIPTION

As required, detailed embodiments of the present invention are disclosed herein. It must be understood that the disclosed embodiments are merely exemplary examples of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

The 911 call notification and callback routing schemes described herein are described with reference to wireless network elements common in a Global System for Mobile communications (GSM) network. Novel network elements for processing 911 call notifications and handling callback routing functions are also described. It should be understood that the present invention as taught herein is not limited to GSM networks and those skilled in the art will find the present invention equally applicable to other wireless networks including, but not limited to, networks utilizing time division multiple access (TDMA), frequency division multiple access (FDMA), code division multiple access (CDMA), wideband code division multiple access (WCDMA), orthogonal frequency division multiplexing (OFDM), and various other 2.0, 2.5G, 3G (third generation), and above wireless communications systems. Examples of suitable enabling bearers include universal mobile telecommunications system (UMTS), enhanced data rates for global evolution (EDGE), high speed downlink packet access (HSDPA), and similar communications protocols, for example.

Figure 1A:
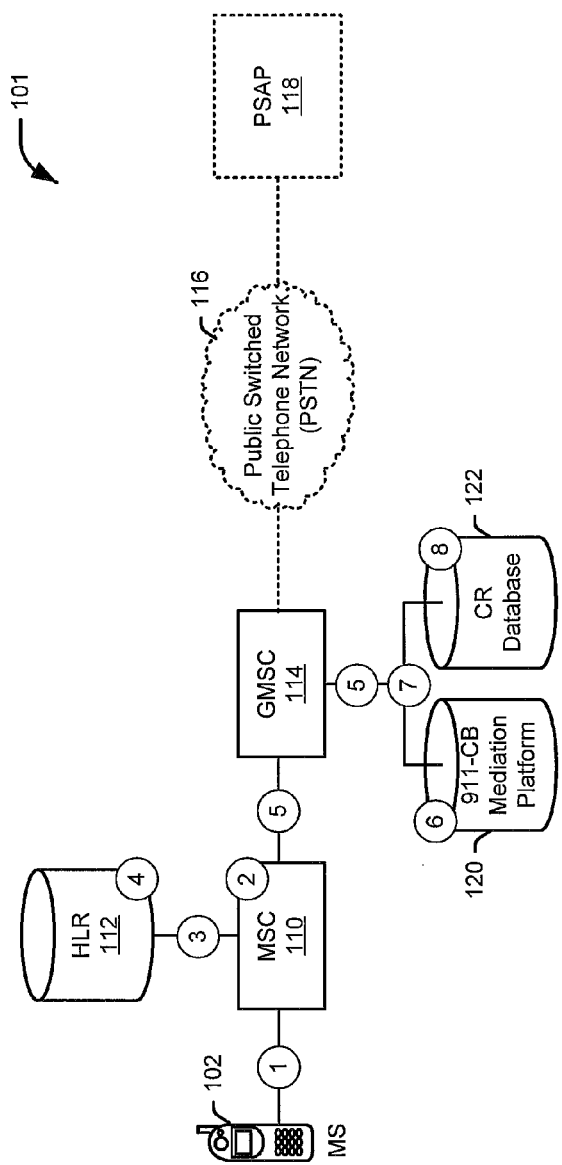
FIGS. 1A and 1B illustrate an exemplary wireless 911 call notification scheme, according to an embodiment of the present invention.

Referring now to FIG. 1A, an exemplary communications network 101 is illustrated. The illustrated communications network 101 includes a mobile station 102 that is in communication with a mobile switching center (MSC) 110. The radio access network elements, including any base transceiver stations (BTS) and base station controllers (BSC) have been eliminated from this view as the functions these elements provide are well-known and do not directly affect the 911 call notification schemes and callback routing schemes described herein.

The MSC 110 is configured for handling switching operations within the network 101. The MSC 110 also connects to location databases, such as a home location register (HLR) 112. The HLR 112 provides routing information for mobile terminated calls and short message service (SMS) messages. The HLR 112 also maintains user subscription information. The MSC 110 is also in communication with a gateway mobile switching center (GMSC) 114. The GMSC 114 provides an edge function for the communications network 101. The GMSC 114 terminates signaling and traffic formats from the public switched mobile network (PSTN) 116 and converts the signaling and traffic to appropriate protocols for use within the communication network 101. The GMSC 114 can also obtain routing information from the HLR 112 for mobile terminated calls. The PSTN 116 is in communication with at least one public safety answering point (PSAP) 118. The PSAP 118 is typically controlled by a county or city, and is responsible for answering 911 emergency calls and dispatching emergency assistance from police, fire, and ambulance services.

In the illustrated network 101, the GMSC 114 is in communication with a 911 callback platform 120 and a call restriction database 122. The 911 callback platform 120 and the call restriction database 122 can be intelligent network (IN) elements, such as service control points (SCP) to implement service control functions in accordance with features of the 911 call notification and callback routing schemes of the present invention, for example. As is known in the art, intelligent networks provide intelligent services that are separated from the network switching functions performed by the MSC 110 and GMSC 114, for example. Accordingly, in an alternative embodiment, the functions described below provided by the 911 callback platform 120 and the call restriction database 122 can be implemented within the MSC 110 and/or GMSC 114.

The 911 callback platform 120 is configured to store customer information for services that may potentially affect 911 callback operations. The 911 callback platform 120 can include appropriate processing and memory facilities to store the customer information. Alternatively, the 911 callback platform 120 can be in communication with one or more networked databases, such as the call restriction database 122 to retrieve the customer information as needed. The call restriction database 122 can periodically update the 911 callback platform 120 with a call restriction status for each customer. If further information with regard to the specifics of a call restriction placed on a customer's account is required, the 911 callback platform 120 can query the call restriction database 122 to acquire the information. The call restriction database 122 may act as a backup of the customer information stored within the 911 callback platform 120.

The 911 callback platform 120 can be configured to use the customer information to determine if a call restriction or other enhanced service is associated with a customer's account. If a call restriction or other enhanced service is present, the 911 callback platform 120 can deactivate the call restriction or other enhanced service temporarily in accordance with override procedures defined by the mobile carrier, a government body (e.g., FCC), or a vendor. The platform 120 may, alternatively, send instructions to the call restriction database 122 or other enhanced service database to deactivate the service in accordance with override procedures defined by the mobile carrier, a government body (e.g., FCC), or a vendor.

An enhanced service is used herein to refer to a service that may, during a 911 callback, interfere or perhaps prevent completion of a 911 callback to the customer should the customer be disconnected from the PSAP 118. Examples of enhanced service include, but are not limited to, call forwarding services (conditional or unconditional), bar all incoming calls (BAIC) within the home public land mobile network (HPLMN), BAIC outside the HPLMN, anonymous call rejection (ACRJ), and any proprietary services offered by the mobile carrier and/or a vendor that could potentially interfere or prevent completion of a 911 callback. Enhanced service databases similar to the call restriction database 122 can be maintained for each enhanced service type.

911 Call Notification Scheme

Figure 1B:
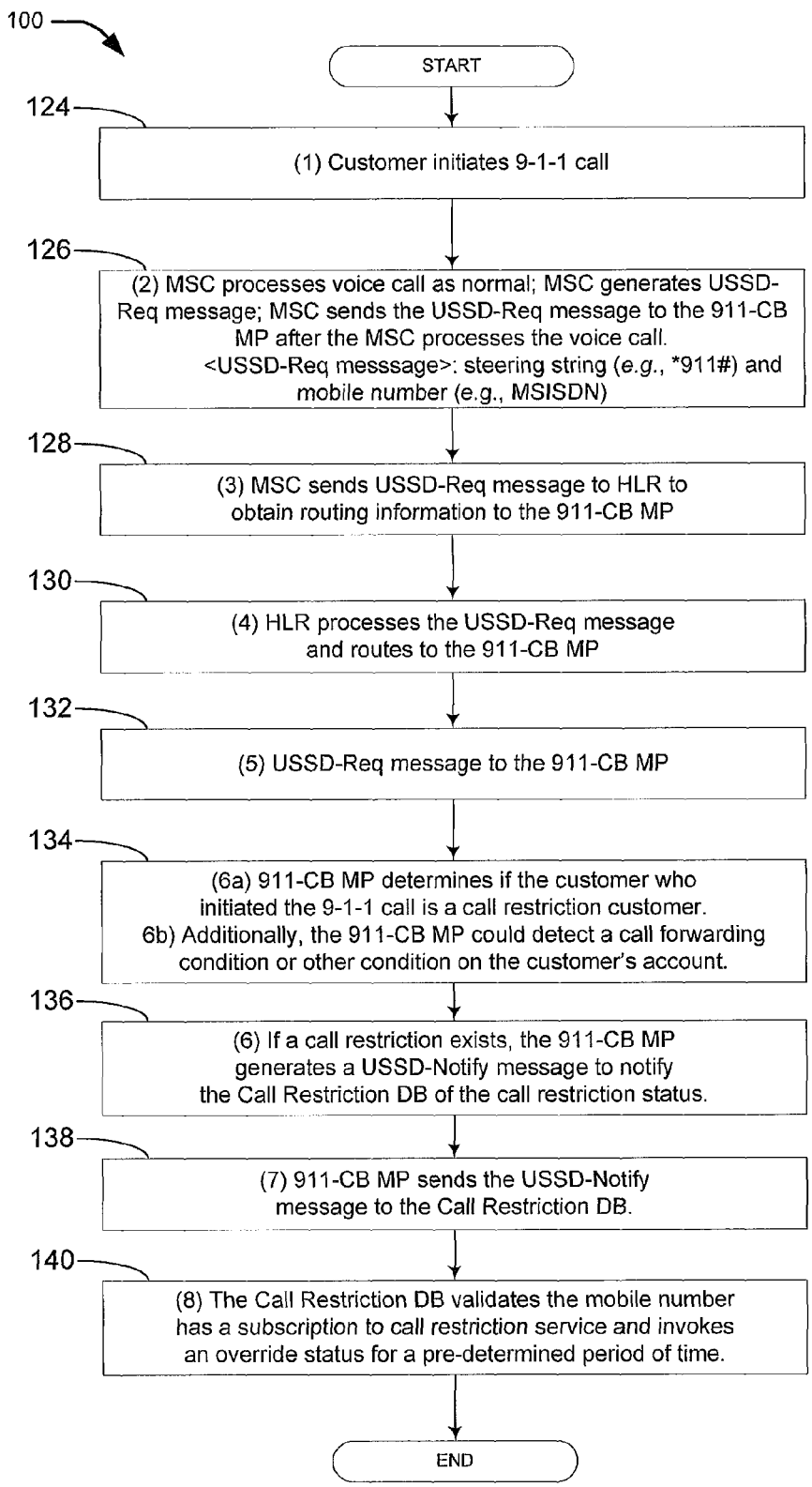

Referring now to FIG. 1B, an exemplary 911 call notification scheme 100 is now described with reference to the elements of FIG. 1A. The notification scheme 100 begins at step 124 when a customer initiates a 911 call. The MSC 100 receives the 911 call and processes the call according to normal call processing procedures, at step 126. In addition, at step 126, the MSC 110 generates a new request message that is used to request any enhanced services to be deactivated.

The request message can include identifying information, such as the mobile station international ISDN number (MSISDN) or the international mobile subscriber identity (IMSI), and routing information, for example. In an exemplary embodiment, the request message is an unstructured supplementary service data (USSD) message and includes the subscriber's MSISDN and a steering string, for example, *911#. In the aforementioned embodiment, appropriate provisions are taken to utilize the USSD protocol. The USSD-Req message is sent in parallel with the actual call so as not to interfere with the call. In alternative embodiments, any protocol that is capable of being delivered without interfering with the 911 call can be used. For example, network CAMEL protocol and short message service (SMS) can be used. Other alternatives are described below.

At step 128, the MSC 110 sends the USSD-Req message to the HLR 112 to obtain routing information to the 911 callback platform 120. The HLR 112 processes the USSD-Req message, at step 130, and routes to the 911 callback platform 120, at step 132. The platform 120 receives the USSD-Req message, at step 134, and determines if the customer who initiated the 911 call is a call restriction customer based on a call restriction status stored within the platform 120 and/or the connected call restriction database 122. The platform 120 can also determine if other enhanced services are enabled for the customer's account. If a call restriction or other enhanced service exists, the platform 120 generates a USSD-Notify message, at step 136, to notify the call restriction database of the call restriction status and provide instructions to deactivate the service in accordance with override procedures defined by the mobile carrier, a government body (e.g., FCC), or a vendor. Alternatively, the platform 120 may deactivate the service using the override procedures in lieu of requesting action by an external system. The platform 120 can later report the deactivated service to the call restriction database 122.

At step 138, the platform 120 sends the USSD-Notify message to the call restriction database 122. At step 140, the call restriction database 122 receives the USSD-Notify message, validates the customer has a subscription to call restriction service and invokes an override status for a pre-determined period of time. The pre-defined time period can be any time period as defined by the mobile carrier. For example, PSAPs can periodically report wireless call logs to the carrier so the carrier can determine an average time for wireless 911 calls and set a time period accordingly.

911 Callback Routing

Figure 2A:
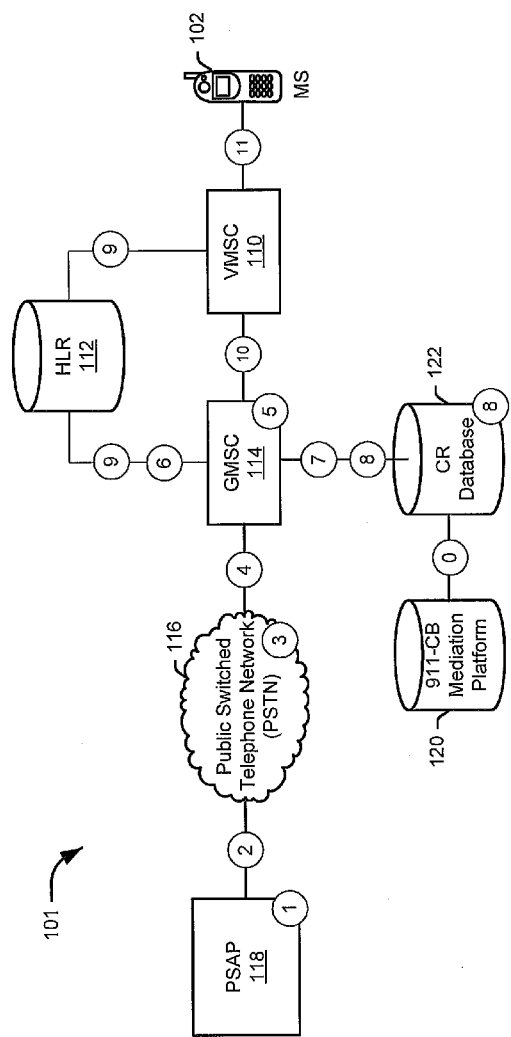
FIGS. 2A and 2B illustrate an exemplary wireless 911 callback routing scheme, according to an embodiment of the present invention.
Figure 2B:
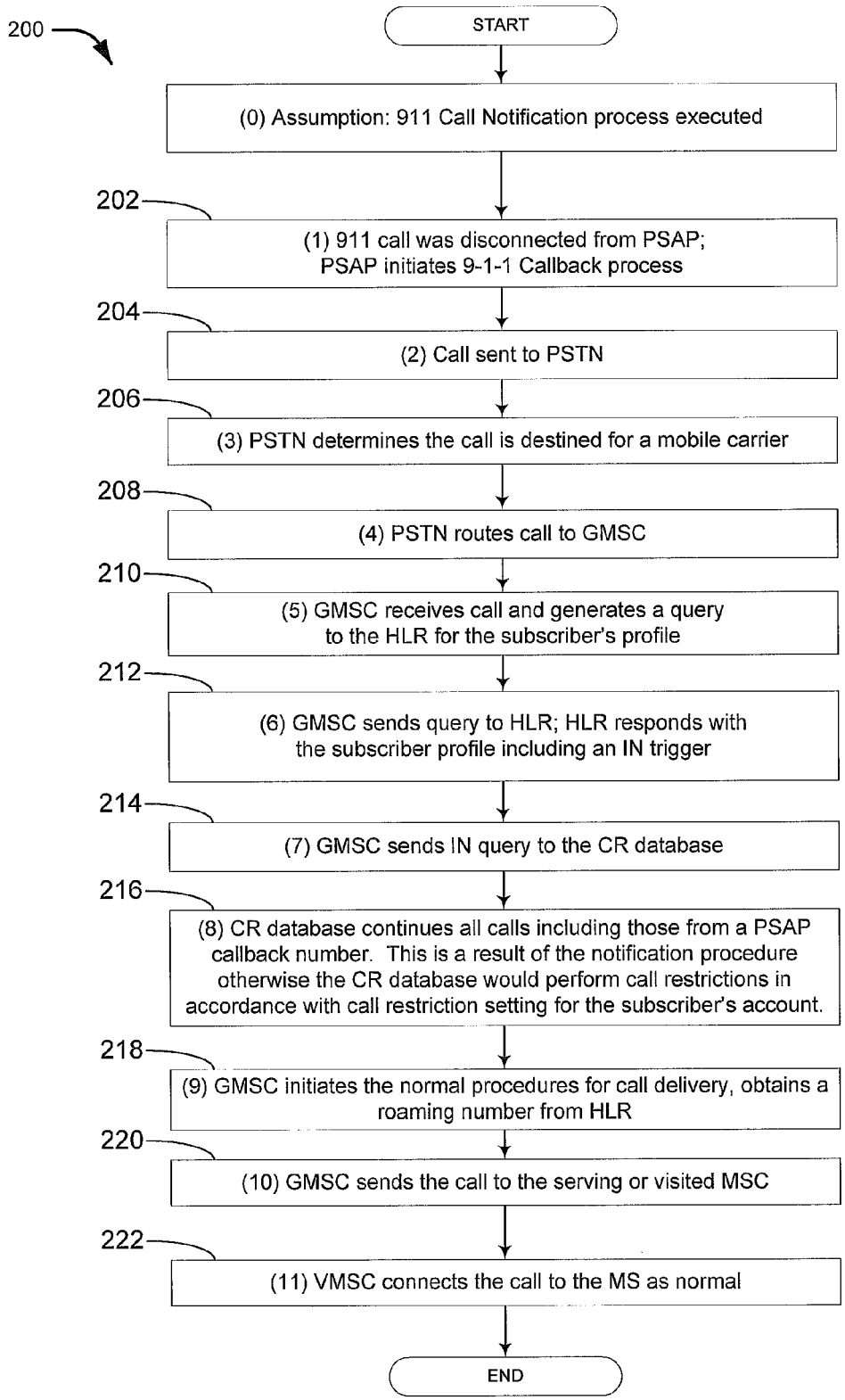

Referring now to FIGS. 2A and 2B, an exemplary callback routing scheme is illustrated using the wireless communications network 101. The illustrated callback routing scheme 200 assumes that a 911 call notification has been executed as described in FIG. 1B. At step 202, a 911 call is disconnected from the PSAP 118 and the PSAP initiates a 911 callback process. At step 204, the call is sent to the PSTN. The PSTN determines the call is destined for a mobile carrier, at step 206, and routes the call to the GMSC 114, at step 208. At step 210, the GMSC 114 receives the 911 call and generates a query to the HLR 112 for the subscriber's profile. The GMSC 114 sends the query to the HLR, at step 212, and the HLR 112 responds with the subscriber profile and a callback trigger. The callback trigger can be an intelligent network (IN) trigger for invoking intelligent network functions present in the 911 callback platform 120 and any associated databases, such as the call restriction database 122, for example. The GMSC 114 sends the callback trigger to the call restriction database 122, at step 214. The call restriction database 122 permits all calls including those from the PSAP callback number, at step 216. This is a result of the notification scheme 100 otherwise the call restriction database 122 would perform call restrictions in accordance with call restriction settings for the customer's account. It should be understood that the IN trigger can be sent directly to the platform and without the need for external systems, such as the call restriction database 122. Various systems incorporating internal database and networked database components are described above with reference to FIGS. 1A and 1B.

At step 218, the GMSC 114 initiates the normal procedures for call delivery and obtains the roaming number from the HLR 112. The GMSC 114 sends the call to the serving MSC (VMSC 110), at step 220. At step 222, the VMSC 110 connects the call to the mobile station 102 as normal.

911 Callback Routing with CFU

Figure 3A:
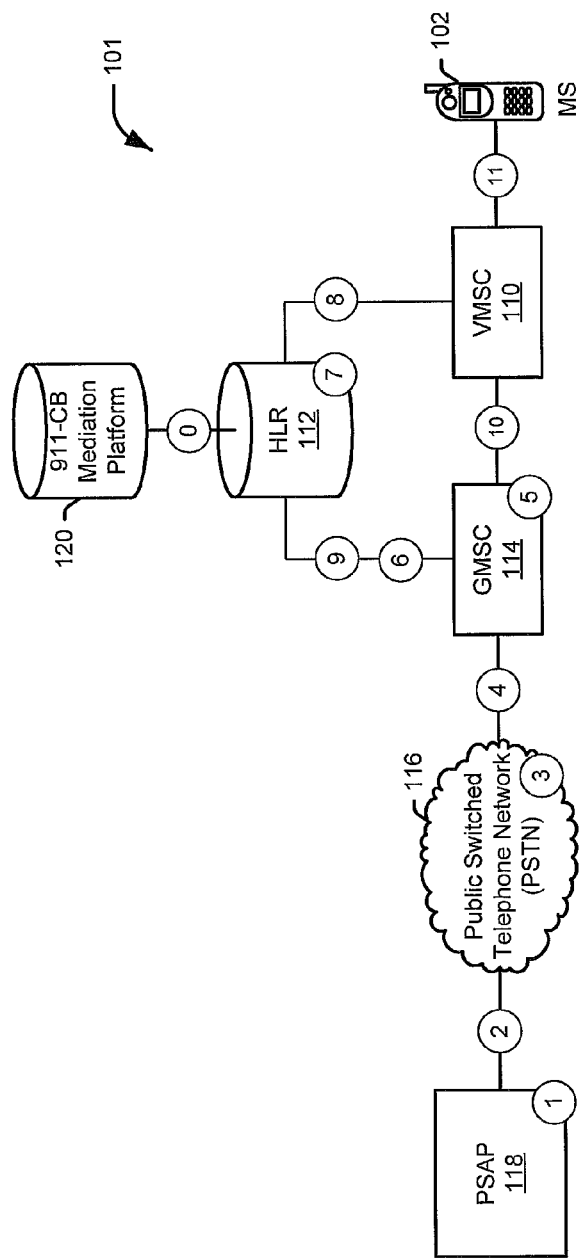
FIGS. 3A and 3B illustrate an exemplary wireless 911 callback routing scheme with call forwarding or other override feature(s), according to an embodiment of the present invention.
Figure 3B:
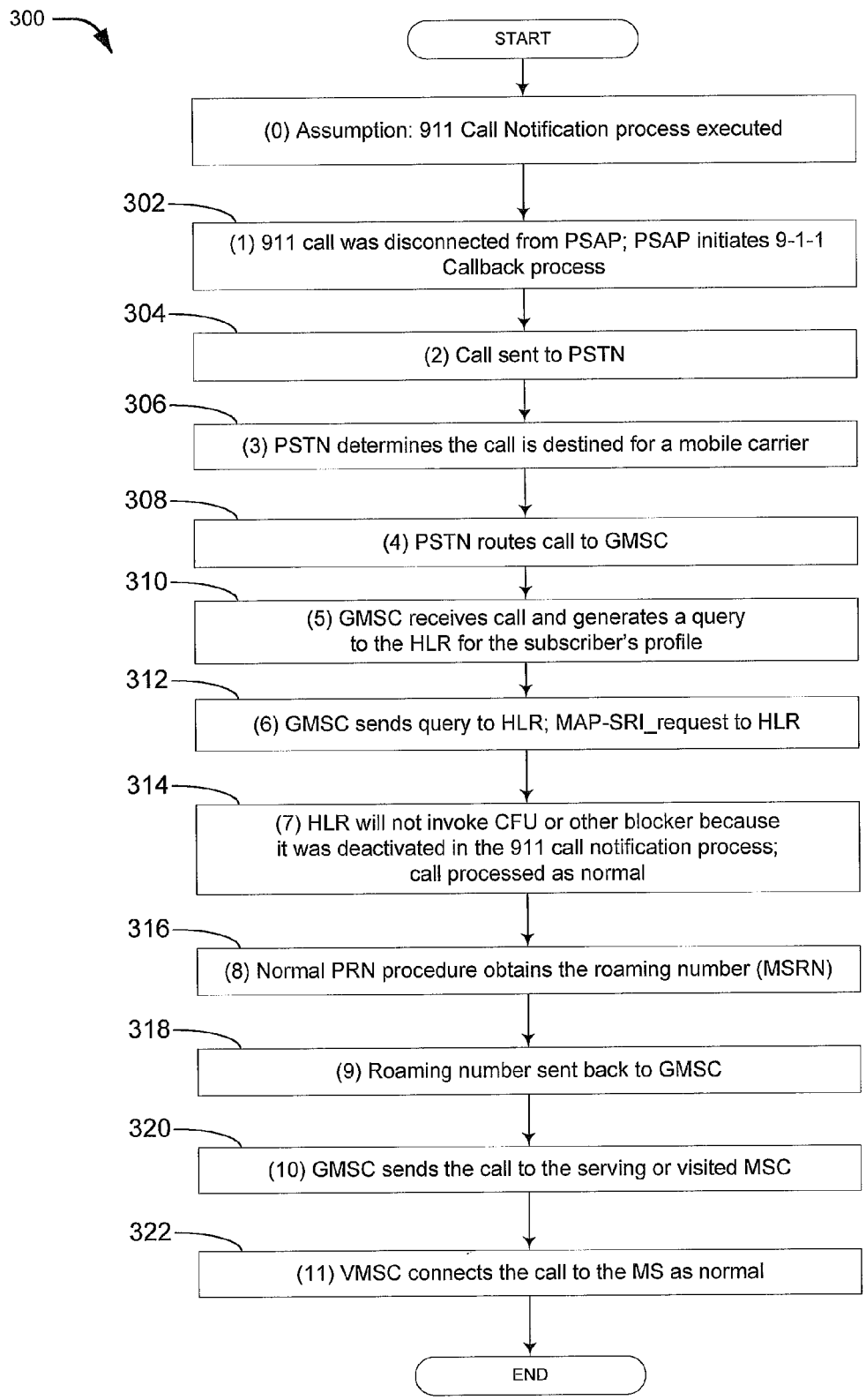

Referring now to FIGS. 3A and 3B, an exemplary callback routing scheme with call forwarding unconditional (CFU) 300 is illustrated using the wireless communications network 101. CFU service allows all calls to be forwarded regardless of the incoming number to a destination number different than the number dialed. The illustrated callback routing scheme 300 assumes that a 911 call notification has been executed as described in FIG. 1B. At step 302, a 911 call is disconnected from the PSAP 118 and the PSAP initiates a 911 callback process. At step 304, the call is sent to the PSTN. The PSTN determines the call is destined for a mobile carrier, at step 306, and routes the call to the GMSC 114, at step 308. At step 310, the GMSC 114 receives the 911 call and generates a query to the HLR 112 for the subscriber's profile. At step 312, the GMSC 114 sends the query to the HLR 112. At step 314, the HLR 112 receives the query and the HLR 112 does not invoke CFU service because it was deactivated in the prior executed 911 notification scheme 100. The HLR 112 processes the call as normal without CFU. At step 316, the GMSC 114 initiates the normal procedures for call delivery and obtains the roaming number from the HLR 112, at step 318. The GMSC 114 sends the call to the serving MSC (VMSC 110), at step 320. At step 322, the VMSC 110 connects the call to the mobile station 102 as normal.

911 Transit Switch Notification

Figure 4A:
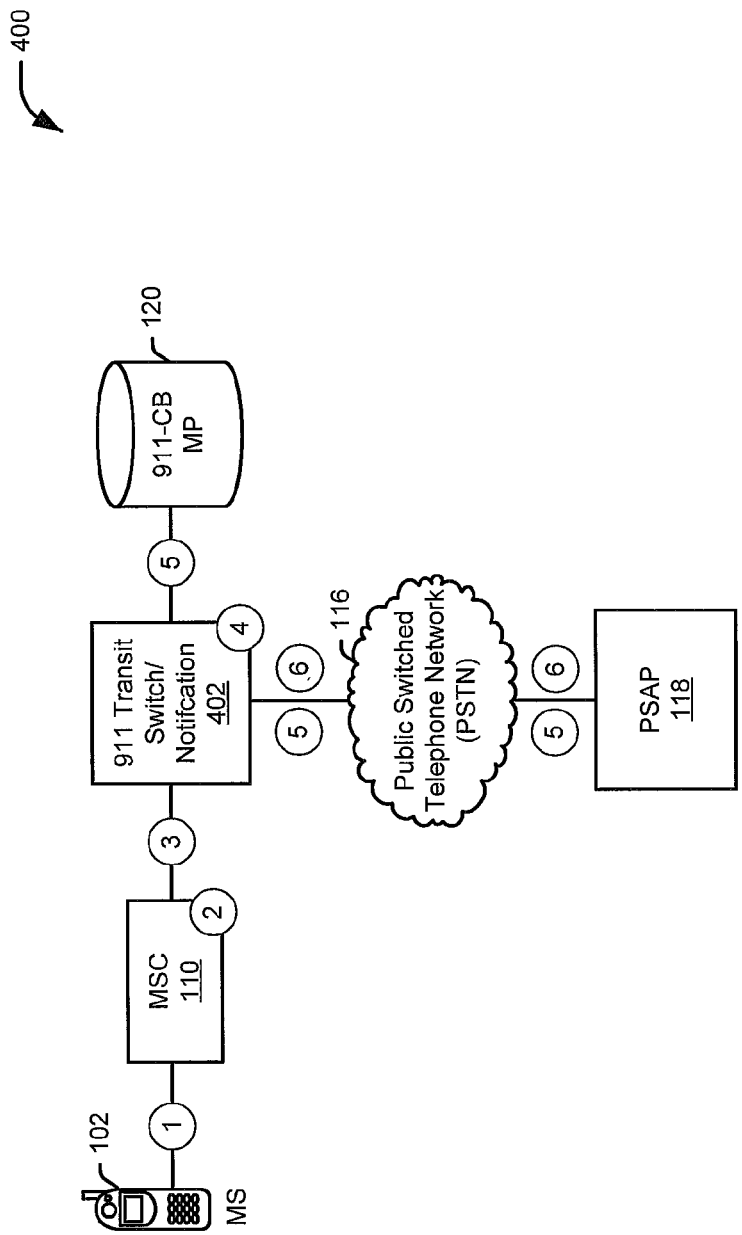
FIGS. 4A and 4B illustrate an exemplary wireless 911 call notification scheme utilizing a 911 transit switch, according to an embodiment of the present invention.
Figure 4B:
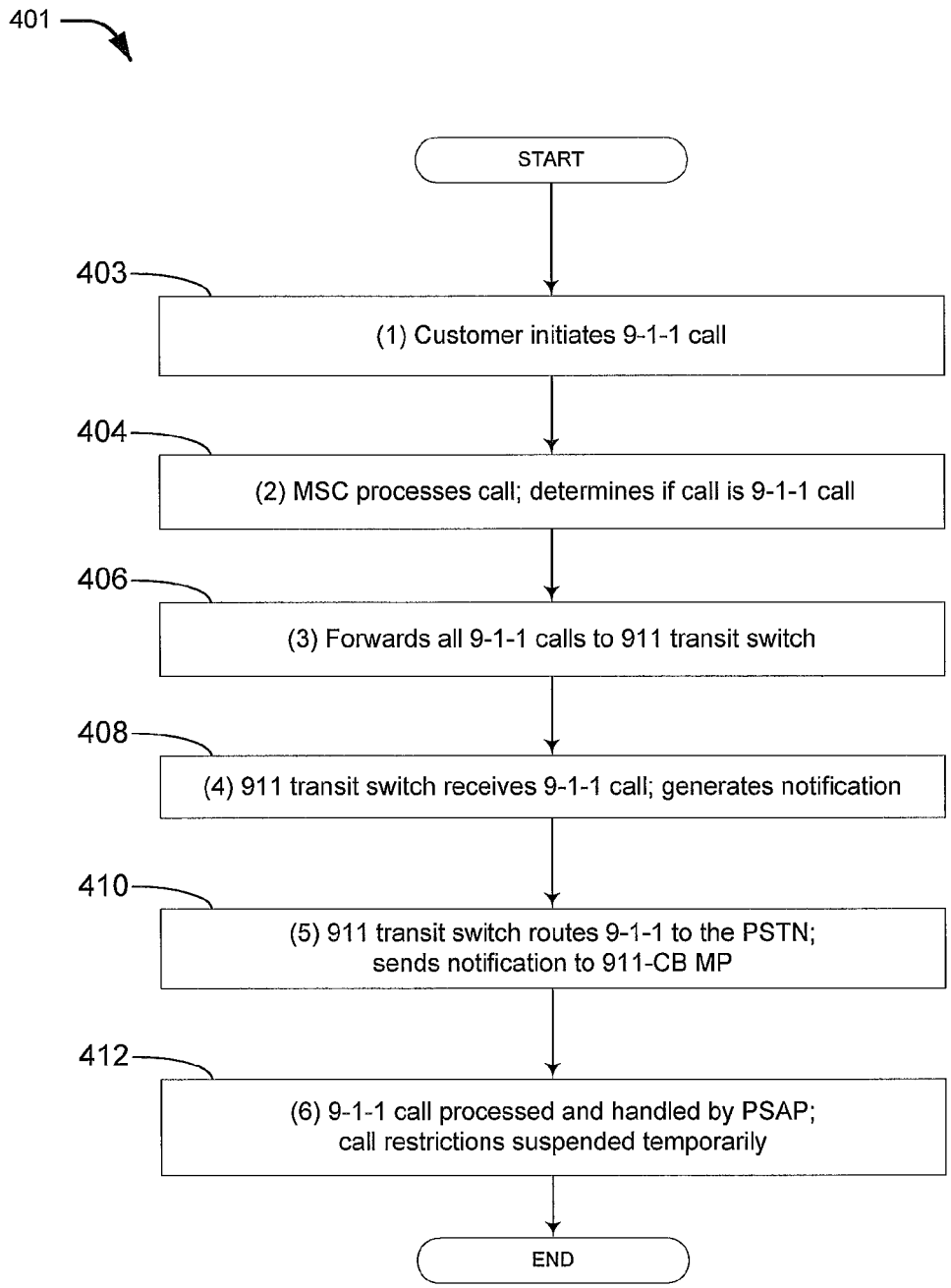

Referring now to FIGS. 4A and 4B, an alternative 911 notification scheme 401 using a 911 transit switch 402 is illustrated. The communications network 400 includes the 911 transit switch 402 and is a modified version of the communications network 100 presented in the previous figures.

The notification scheme 401 begins at step 403 when a customer initiates a 911 call. At step 404, the MSC 110 receives the 911 call and determines the call is a 911 call. At step 406, the MSC 110 forwards the 911 call to the 911 transit switch 402. The transit switch 402 receives the 911 call and generates a notification message, at step 408. At step 410, the transit switch 402 routes the 911 (voice) call to the PSTN 116 for subsequent routing to the appropriate PSAP 118. During step 410 the transit switch 402 also sends the notification message to the 911 callback platform 120. At step 412, the 911 call is processed as normal by the PSAP 118. Any call restrictions are temporarily disabled by the 911 callback platform 120 such that if the 911 call is disconnected, the PSAP 118 can perform a successful callback.

911 Call Notification via GMLC

Figure 5A:
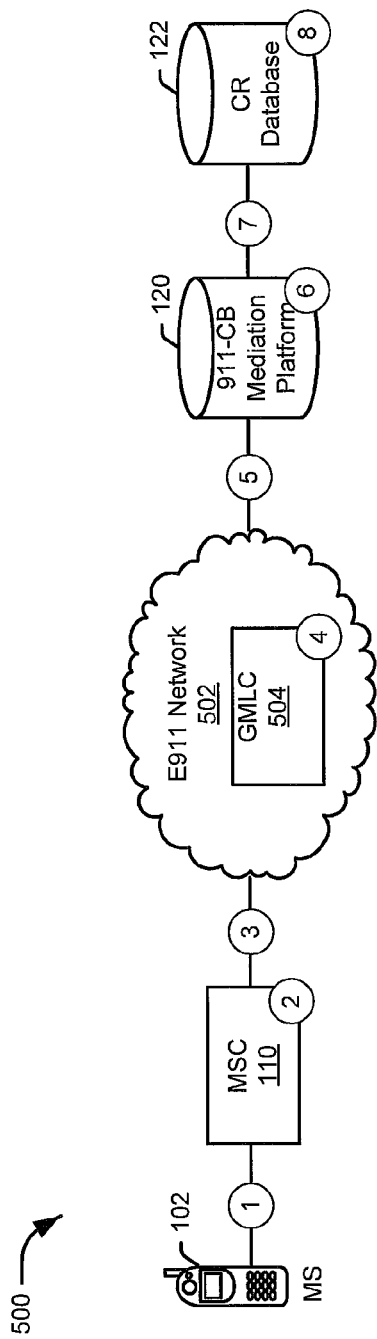
FIGS. 5A and 5B illustrate an exemplary wireless 911 call notification scheme utilizing a gateway mobile location center (GMLC), according to an embodiment of the present invention.
Figure 5B:
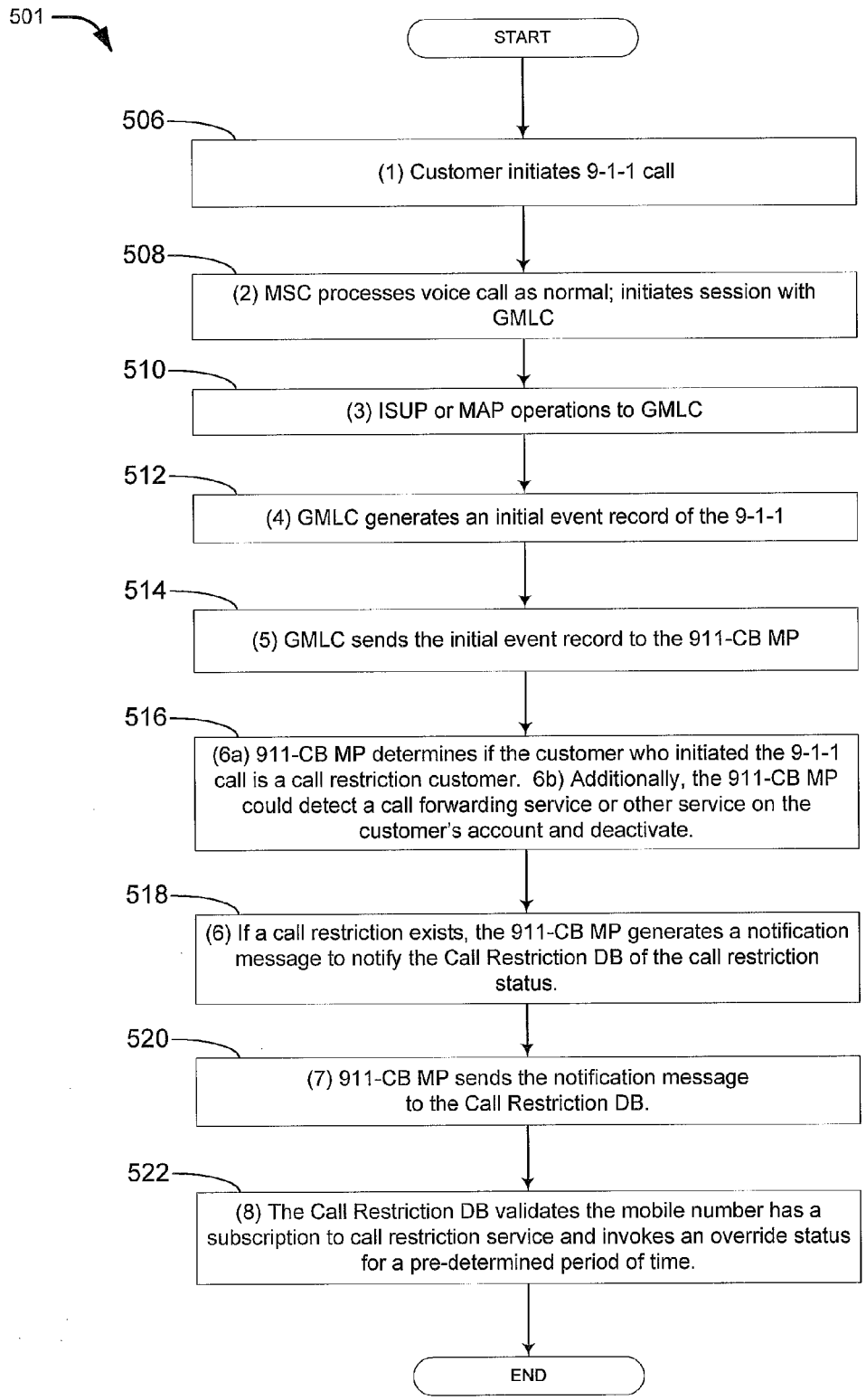

Referring now to FIGS. 5A and 5B, an alternative 911 notification scheme 501 using a gateway mobile location center (GMLC) 504 is illustrated. The communications network 500 includes an E911 network 502 and a GMLC 504 and is a modified version of the communications network 100 presented in the previous figures.

The notification scheme 501 begins at step 506 when a customer initiates a 911 call. The MSC 110 receives the 911 call and processes the call according to normal call processing procedures, at step 508. The MSC 110 also initiates a session with the GMLC 504, at step 508. At step 510, a connection is established between the MSC 110 and the GMLC 504. At step 512, the GMLC 504 generates an initial event record of the 911 call. At step 514, the GMLC 504 sends the initial event record to the 911 callback platform 120. At step 516, the platform 120 receives the message and determines if the customer who initiated the 911 call is a call restriction customer based on a call restriction status stored within the platform 120 and/or the connected call restriction database 122. The platform 120 can also determine if other enhanced services are enabled for the customer's account. If a call restriction or other enhanced service exists, the platform 120 generates a notification message, at step 518, to notify the call restriction database 122 of the call restriction status and provide instructions to deactivate the service in accordance with override procedures defined by the mobile carrier, a government body (e.g., FCC), or a vendor. Alternatively, the platform 120 may deactivate the service using the override procedures in lieu of requesting action by an external system. The platform 120 can later report the deactivated service to the call restriction database 122.

At step 520, the platform 120 sends the notification message to the call restriction database 122. At step 522, the call restriction database 122 receives the notification message, validates the customer has a subscription to call restriction service and invokes an override status for a pre-determined period of time.

Figure 6:
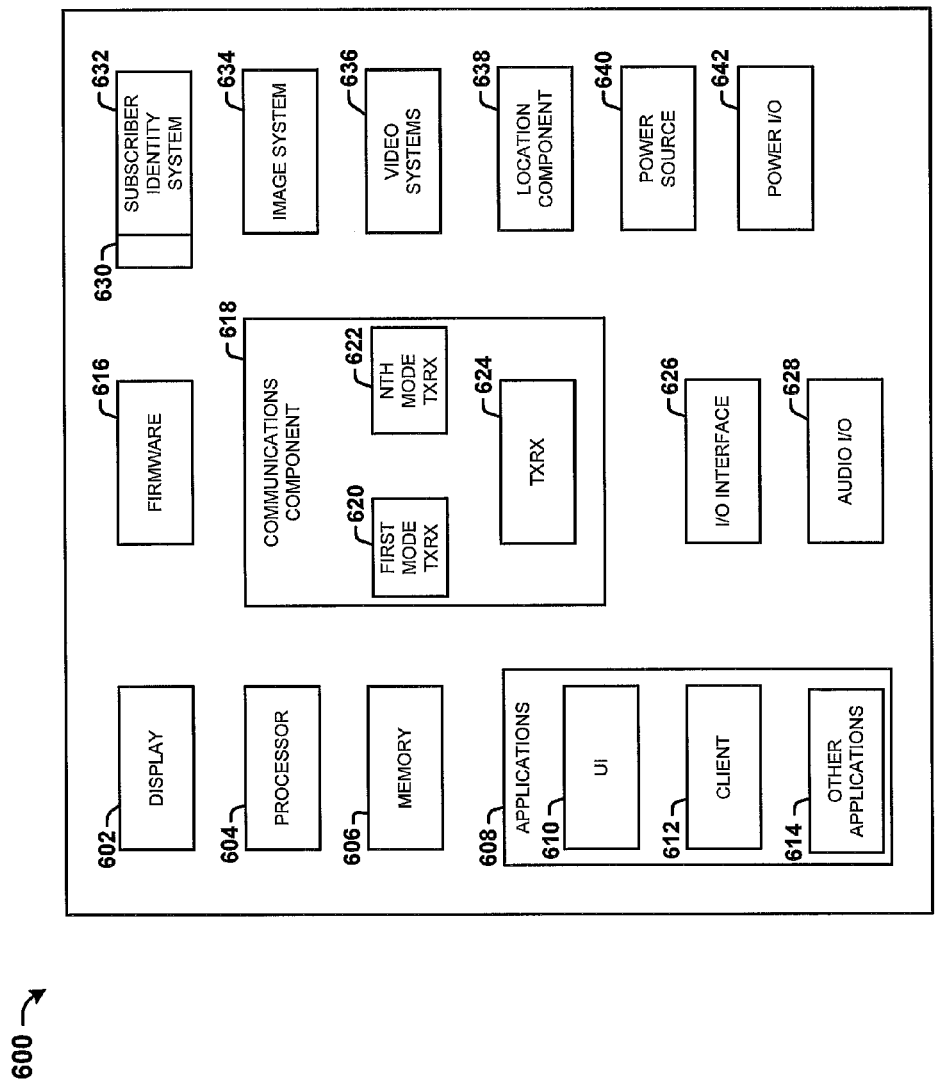
FIG. 6 is a diagram illustrating an exemplary mobile device and components thereof, according to the present invention.

FIG. 6 illustrates a schematic block diagram of an exemplary mobile device 600 for use in accordance with an exemplary embodiment of the present invention. The mobile device 600 can be the mobile station 102, for example. Although no connections are shown between the components illustrated and described in FIG. 6, the components can interact with each other to carry out device functions.

As illustrated, the mobile device 600 can be a multimode handset. FIG. 6 and the following discussion are intended to provide a brief, general description of a suitable environment in which the various aspects of an embodiment of the present invention can be implemented. While the description includes a general context of computer-executable instructions, the present invention can also be implemented in combination with other program modules and/or as a combination of hardware and software.

Generally, applications can include routines, program modules, programs, components, data structures, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

The device 600 includes a display 602 for displaying multimedia such as, for example, text, images, video, telephony functions, such as, caller line ID data, setup functions, menus, music metadata, messages, wallpaper, graphics, and the like.

The device 600 can include a processor 604 for controlling, and/or processing data. A memory 606 can interface with the processor 604 for the storage of data and/or applications 608. The memory 606 can include a variety of computer readable media, including volatile media, non-volatile media, removable media, and non-removable media. Computer-readable media can include device storage media and communication media. Storage media can include volatile and/or non-volatile, removable and/or non-removable media such as, for example, RAM, ROM, EEPROM, flash memory or other memory technology, CD ROM, DVD, or other optical disk storage, magnetic tape, magnetic disk storage or other magnetic storage devices, or any other medium that can be used to store the desired information and that can be accessed by the device 600.

The memory 606 can be configured to store one or more applications 608, such as, for example, an E911 client application for generating 911 call notification messages. The applications 608 can also include a user interface (UI) application 610. The UI application 610 can interface with a client 612 (e.g., an operating system) to facilitate user interaction with device functionality and data, for example, answering/ initiating calls, entering/deleting data, configuring settings, address book manipulation, multimode interaction, and the like. The applications 608 can include other applications 614 such as, for example, add-ons, plug-ins, voice recognition software, call voice processing, voice recording, messaging, e-mail processing, video processing, image processing, music play, combinations thereof, and the like, as well as subsystems and/or components. The applications 608 can be stored in the memory 606 and/or in a firmware 616, and can be executed by the processor 604. The firmware 616 can also store code for execution during initialization of the device 600.

A communications component 618 can interface with the processor 604 to facilitate wired/wireless communications with external systems including, for example, cellular networks, VoIP networks, LAN, WAN, MAN, PAN, that can be implemented using WiFi, WiMax, combinations and/or improvements thereof, and the like. The communications component 618 can also include a multimode communications subsystem for providing cellular communications via different cellular technologies. For example, a first cellular transceiver 620 can operate in one mode, for example, GSM, and an Nth transceiver 622 can operate in a different mode, for example WiFi. While only two transceivers 620, 622 are illustrated, it should be appreciated that a plurality of transceivers can be included. The communications component 618 can also include a transceiver 624 for unlicensed RF communications using technology such as, for example, WiFi, WiMax, NFC, other RF and the like. The transceiver 624 can also be configured for line-of-sight technologies, such as, for example, infrared and IRDA. Although a single transceiver 624 is illustrated multiple transceivers for unlicensed RF and line-of-sight technologies are contemplated.

The communications component 618 can also facilitate communications reception from terrestrial radio networks, digital satellite radio networks, Internet-based radio services networks, combinations thereof, and the like. The communications component 618 can process data from a network, such as, for example, the Internet, a corporate intranet, a home broadband network, and the like, via an ISP, DSL provider, or other broadband service provider.

An input/output (I/O) interface 626 can be provided for input/output of data and/or signals. The I/O interface 626 can be a hardwire connection, such as, for example, a USB, PS2, IEEE 1394, serial, parallel, IEEE 802.3 (e.g., Ethernet—RJ45, RJ48), traditional telephone jack (e.g., RJ11, RJ14, RJ25) and the like, and can accept other I/O devices, such as, for example, a keyboard, keypad, mouse, interface tether, stylus pen, printer, plotter, jump/thumb drive, touch screen, touch pad, trackball, joy stick, controller, monitor, display, LCD, combinations thereof, and the like.

Audio capabilities can be provided by an audio I/O component 628 that can include a speaker (not shown) for the output of audio signals and a microphone (not shown) to collect audio signals.

The device 600 can include a slot interface 630 for accommodating a subscriber identity system 632, such as, for example, a SIM or universal SIM (USIM). The subscriber identity system 632 instead can be manufactured into the device 600, thereby perhaps obviating the need for a slot interface 630.

The device 600 can include an image capture and processing system 634. Photos and/or videos can be obtained via an associated image capture subsystem of the image system 634, for example, a camera. The device 600 can also include a video systems component 634 for processing, recording, and/ or transmitting video content.

A location component 638 can be included to send and/or receive signals, such as, for example, GPS data, assisted GPS data, triangulation data, combinations thereof, and the like. The device 600 can use the received data to identify its location or can transmit data used by other devices to determine the device 600 location.

The device 600 can include a power source 640 such as batteries and/or other power subsystem (AC or DC). The power source 640 can be single-use, continuous, or rechargeable. In the case of the latter, the power source 640 can interface with an external power system or charging equipment via a power I/O component 642.

Handset-Originated Request Message

An E911 client application can be configured to generate a request message to be sent to the MSC 110 and directed to the appropriate service database to disable services that may potentially interfere or perhaps prevent a 911 callback should the mobile station 102 and the PSAP 118.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A method for processing an emergency call originating from a mobile device associated with a customer, the emergency call having been received by a mobile switching center (MSC) and connected to a public safety answering point (PSAP), the method comprising:
   receiving a request message at an emergency callback platform, the request message having been generated by the MSC, and the request message seeking to determine whether the customer is subscribed to an enhanced service that, when activated, interferes with an emergency callback that is typically initiated in response to the emergency call being disconnected from the PSAP;
   determining, at the emergency callback platform, that the customer is subscribed to the enhanced service that, when activated, interferes with an emergency callback that is typically initiated in response to the emergency call being disconnected from the PSAP;
   responsive to determining that the customer is subscribed to the enhanced service, generating, at the emergency callback platform, a notification message directed to an enhanced service database that is configured to validate the customer and disable the enhanced service for a pre-determined time period so as to allow completion of the emergency callback; and
   routing the notification message to the enhanced service database.

2. The method of claim 1, wherein the request message comprises a mobile subscriber ISDN number (MSISDN), and the method further comprises:
   validating, at the enhanced service database, the wireless telephone customer based upon the MSISDN; and
   disabling, at the enhanced service database, the enhanced service for a pre-determined time period.

3. The method of claim 1, wherein the request message comprises an international mobile subscriber identity (IMSI), and the method further comprises:
  validating, at the enhanced service database, the wireless telephone customer based upon the IMSI; and
  disabling, at the enhanced service database, the enhanced service for a pre-determined time period.

4. The method of claim 1, wherein the request message is an unstructured supplementary service data (USSD) message.

5. The method of claim 1, wherein the request message is a short message service (SMS) message.

6. The method of claim 1, wherein the request message is a CAMEL message.

7. The method of claim 1, wherein the request message is an out-of-band message.

8. The method of claim 1, wherein the request message is routed to the emergency callback platform in parallel with the emergency call being routed to the PSAP.

9. The method of claim 1, wherein the enhanced service is a call restriction service.

10. The method of claim 1, wherein the enhanced service is a call forwarding service.

11. The method of claim 1, wherein the enhanced service is a bar all incoming calls (BAIC) service.

12. The method of claim 1, wherein the enhanced service is an anonymous call rejection service.

13. The method of claim 1, wherein the enhanced service is a proprietary service provided by one of a mobile carrier and a vendor.

14. The method of claim 1, wherein the notification message is an unstructured supplementary service data (USSD) message.

15. The method of claim 1, wherein the notification message is a short message service (SMS) message.

16. The method of claim 1, wherein the notification message is a CAMEL message.

17. The method of claim 1, wherein the notification message is an out-of-band message.

18. The method of claim 1, wherein the notification message is routed to the emergency callback platform in parallel with the emergency call being routed to the PSAP.

19. The method of claim 1 further comprising:
  the emergency call being disconnected from the PSAP;
  receiving the emergency callback at the MSC response to the emergency call being disconnected from the PSAP;
  querying the enhanced service database to determine a status of the enhanced service, the status identifying whether the enhanced service is one of enabled and disabled; and
  connecting the emergency callback to the mobile device in accordance with normal call delivery procedures.

20. A method for processing an emergency call via an emergency transit switch, the emergency call originating from a mobile device associated with a customer, the emergency call having been received by a mobile switching center (MSC), routed to the emergency transit switch, and connected to a public safety answering point (PSAP), the method comprising:
  receiving a request message at an emergency callback platform, the request message having been generated by the emergency transit switch, and the request message seeking to determine whether the customer is subscribed to an emergency service that, when activated, interferes with an emergency callback that is typically initiated in response to the emergency call being disconnected to the PSAP;
  determining, at the emergency callback platform, that the customer is subscribed to the enhanced service that, when activated, interferes with an emergency callback that is typically initiated in response to the emergency call being disconnected from the PSAP;
  validating the customer; and
  disabling the enhanced service for a pre-determined time period, so as to allow completion of the emergency callback.

21. The method of claim 20 further comprising:
  receiving the emergency callback, at the MSC, in response to the emergency call being disconnected from the PSAP;
  querying the emergency callback platform to determine a status of the enhanced service, the status identifying whether the enhanced service is one of enabled and disabled; and
  connecting the emergency callback to the mobile device in accordance with normal call delivery procedures.

22. The method of claim 20, wherein the request message comprises a mobile subscriber ISDN number (MSISDN), and validating the customer comprises validating the customer based upon the MSISDN.

23. The method of claim 20, wherein the request message comprises an international mobile subscriber identity (IMSI), and validating the customer comprises validating the customer based upon the IMSI.

24. The method of claim 20, wherein the request message is an unstructured supplementary service data (USSD) message.

25. The method of claim 20, wherein the request message is a short message service (SMS) message.

26. The method of claim 20, wherein the request message is a CAMEL message.

27. The method of claim 20, wherein the request message is an out-of-band message.

28. The method of claim 20, wherein the request message is routed to the emergency callback platform in parallel with the emergency call being routed to the PSAP.

29. The method of claim 20, wherein the enhanced service is a call restriction service.

30. The method of claim 20, wherein the enhanced service is a call forwarding service.

31. The method of claim 20, wherein the enhanced service is a bar all incoming call (BAIC) service.

32. The method of claim 20, wherein the enhanced service is an anonymous call rejection service.

33. The method of claim 20, wherein the enhanced service is a proprietary service provided by one of a mobile carrier and a vendor.

34. A method for processing an emergency call via a gateway mobile location center (GMLC), the emergency call originating from a mobile device associated with a customer, the emergency call having been received by a mobile switching center (MSC), and having been connected to a public switched answering point (PSAP), the method comprising:
  receiving an event record at an emergency callback platform, the event record having been generated by the GMLC;
  Determining, at the emergency callback platform, that the customer is subscribed to an enhanced service that, when activated, interferes with an emergency callback that is typically initiated in response to the emergency call being disconnected from the PSAP;
  validating the customer; and disabling the enhanced service for a pre-determined time period, so as to allow completion of the emergency callback.

35. The method of claim 34 further comprising:
receiving the emergency callback, at the MSC, in response to the emergency call being disconnected from the PSAP;
querying the emergency callback platform to determine a status of the enhanced service; the status identifying whether the enhanced service is one of enabled and disabled; and
connecting the emergency callback to the mobile device in accordance with normal call delivery procedures.

36. The method of claim 34, wherein the identification information is event record comprises a mobile subscriber ISDN number (MSISDN), and validating the customer comprises validating the customer based upon the MSISDN.

37. The method of claim 34, wherein the event record comprises an international mobile subscriber identity (IMSI), and validating the customer comprises validating the customer based upon the IMSI.

38. The method of claim 34, wherein the event record is routed to the emergency callback platform in parallel with the emergency call being routed to the PSAP.

39. The method of claim 34, wherein the enhanced service is a call restriction service.

40. The method of claim 34, wherein the enhanced service is a call forwarding service.

41. The method of claim 34, wherein the enhanced service is a bar all incoming calls (BAIC) service.

42. The method of claim 34, wherein the enhanced service is an anonymous call rejection service.

43. The method of claim 34, wherein the enhanced service is a proprietary service provided by one of a mobile carrier and a vendor.

44. A system for processing an emergency call, the system comprising:
a callback platform in communication with a mobile switching center (MSC), the callback platform being configured to receive and process a request message to determine that a wireless telephone service customer is subscribed to an enhanced service that, when activated, interferes with an emergency callback that is typically initiated in response to the emergency call being disconnected from a public safety answering point (PSAP);
the callback platform being further configured to validate the wireless telephone service customer and disable the enhanced service for a pre-determined time period so as to allow completion of the emergency callback.

45. The system of claim 44 further comprising:
an emergency transit switch, in communication with the MSC and the callback platform;
the emergency transit switch being configured to generate the request message and route the request message to the callback platform.

46. The system of claim 44 further comprising:
a gateway mobile location center (GMLC), in communication with the MSC and the callback platform;
the GMLC being configured to generate the request message and route the request message to the callback platform.

47. A non-transitory computer-readable medium comprising computer-executable instructions that, when executed by a processor, cause the processor to perform a method for processing an emergency call, the method comprising:
receiving a request message, the request message having been generated by a mobile switching center (MSC), and the request message seeking to determine whether a customer is subscribed to an enhanced service that, when activated, interferes with an emergency callback that is typically initiated in response to the emergency call being disconnected from a public safety answering point (PSAP);
determining that the customer is subscribed to the enhanced service that, when activated, interferes with an emergency callback that is typically initiated in response to the emergency call being disconnected from the PSAP;
responsive to determining that the customer is subscribed to the enhanced service, generating a notification message directed to an enhanced service database that is configured to validate the customer and disable the enhanced service for a pre-determined time period so as to allow completion of the emergency callback; and
routing the notification message to the enhanced service database.

48. The non-transitory computer-readable medium of claim 47, wherein the request message comprises one of a mobile subscriber ISDN number (MSISDN) and an international mobile subscriber identity (IMSI).

49. The non-transitory computer-readable medium of claim 47,
wherein the request message is one of the following:
an unstructured supplementary service data (USSD) message;
a short message service (SMS) message;
a CAMEL message; and
an out-of-band message.

50. The non-transitory computer-readable medium of claim 47,
wherein the enhanced service is one of the following:
a call restriction service;
a call forwarding service;
a bar all incoming calls (BAIC) service;
an anonymous call rejection service; and
a proprietary service provided by one of a mobile carrier and a vendor.

51. The non-transitory computer-readable medium of claim 47, wherein the notification message is one of the following:
an unstructured supplementary service data (USSD) message;
a short message service (SMS) message;
a CAMEL message; and an out-of-band message.

52. A non-transitory computer-readable medium comprising computer-executable instructions that, when executed by a processor, cause the processor to perform a method for processing an emergency call, the method comprising:
receiving a request message, the request message having been generated by an emergency transit switch, and the request message seeking to determine whether a customer is subscribed to an enhanced service that, when activated, interferes with an emergency callback that is typically initiated in response to the emergency call being disconnected from a public safety answering point (PSAP);
determining, following receipt of the request message, that the customer is subscribed to the enhanced service that, when activated, interferes with an emergency callback that is typically initiated in response to the emergency call being disconnected from the PSAP;
validating the customer; and disabling the enhanced service for a pre-determined time period, so as to allow completion of the emergency callback.

53. The non-transitory computer-readable medium of claim 52, wherein the request message comprises one of a mobile subscriber ISDN number (MSISDN) and an international mobile subscriber identity (IMSI), and validating the customer comprises validating the customer based upon one of the MSISDN and the IMSI.

54. The non-transitory computer-readable medium of claim 52, wherein the request message is one of the following:
an unstructured supplementary service data (USSD) message;
a short message service (SMS) message;
a CAMEL message; and
an out-of-band message.

55. The non-transitory computer-readable medium of claim 52, wherein the enhanced service is one of the following:
a call restriction service;
a call forwarding service;
a bar all incoming calls (BA1C);
an anonymous call rejection service; and
a proprietary service provided by one of a mobile carrier and a vendor.

56. The non-transitory computer-readable medium of claim 52, wherein the notification message is one of the following:
an unstructured supplementary service data (USSD) message;
a short message service (SMS) message;
a CAMEL message; and
an out-of-band message.

57. A non-transitory computer-readable medium comprising computer-executable instructions that, when executed by a processor, cause the processor to perform a method for processing an emergency call, the method comprising:
receiving an event record, the event record having been generated by a gateway mobile location center (GMLC), the event record being associated with whether a customer is subscribed to an enhanced service that, when activated, interferes with an emergency callback that is typically initiated in response to the emergency call being disconnected from a public safety answering point (PSAP);
determining, following receipt of the event record, that the customer is subscribed to the enhanced service that, when activated, interferes with an emergency callback that is typically initiated in response to the emergency call being disconnected from the PSAP;
validating the customer; and
disabling the enhanced service for a pre-determined time period, so as to allow completion of the emergency callback.

58. The non-transitory computer-readable medium of claim 57, wherein the event record comprises one of a mobile subscriber ISDN number (MSISDN) and an international mobile subscriber identity (IMSI), and validating the customer comprises one of validating the customer based upon one of the MSISDN and the IMSI.

59. The non-transitory computer-readable medium of claim 57, wherein the enhanced service is one of the following:
a call restriction service;
a call forwarding service;
a bar all incoming calls (BAIC) service;
an anonymous call rejection service; and
a proprietary service provided by one of a mobile carrier and a vendor.

* * * * *